(12) United States Patent
Zhang et al.

(10) Patent No.: US 10,911,769 B2
(45) Date of Patent: Feb. 2, 2021

(54) MOTION-BASED PRIORITY FOR THE CONSTRUCTION OF CANDIDATE LISTS IN VIDEO CODING

(71) Applicant: QUALCOMM Incorporated, San Diego, CA (US)

(72) Inventors: Kai Zhang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/014,947

(22) Filed: Jun. 21, 2018

(65) Prior Publication Data

US 2018/0376160 A1    Dec. 27, 2018

Related U.S. Application Data

(60) Provisional application No. 62/524,420, filed on Jun. 23, 2017.

(51) Int. Cl.
| | |
|---|---|
| *H04N 19/513* | (2014.01) |
| *H04N 19/137* | (2014.01) |
| *H04N 19/124* | (2014.01) |
| *H04N 19/105* | (2014.01) |
| *H04N 19/58* | (2014.01) |
| *H04N 19/52* | (2014.01) |
| *H04N 19/597* | (2014.01) |
| *H04N 19/70* | (2014.01) |
| *H04N 19/503* | (2014.01) |

(52) U.S. Cl.
CPC ........ *H04N 19/513* (2014.11); *H04N 19/105* (2014.11); *H04N 19/124* (2014.11); *H04N 19/137* (2014.11); *H04N 19/52* (2014.11); *H04N 19/58* (2014.11); *H04N 19/597* (2014.11); *H04N 19/70* (2014.11); *H04N 19/503* (2014.11)

(58) Field of Classification Search
None
See application file for complete search history.

(56) References Cited

U.S. PATENT DOCUMENTS

2009/0304084 A1*  12/2009  Hallapuro ............ H04N 19/593
                                                       375/240.16
2012/0320969 A1*  12/2012  Zheng ................... H04N 19/40
                                                       375/240.02

(Continued)

FOREIGN PATENT DOCUMENTS

WO    WO-2013106336 A2    7/2013

OTHER PUBLICATIONS

International Search Report and Written Opinion—PCT/US2018/039066—ISA/EPO—dated Oct. 26, 2018.

*Primary Examiner* — Kate H Luo
(74) *Attorney, Agent, or Firm* — John Rickenbrode

(57) ABSTRACT

Embodiments include techniques for generation of candidate motion vector lists for use in inter-prediction. For example, according to some embodiments, a candidate motion vector list is generated to have an order that is based on motion information of each of the candidate motion vectors. The order can be applied as the list is generated, as a resorting after the list is partially generated, or after the list is generated.

18 Claims, 12 Drawing Sheets

(56) References Cited

U.S. PATENT DOCUMENTS

| | | | |
|---|---|---|---|
| 2012/0320984 A1* | 12/2012 | Zhou | H04N 19/50 375/240.16 |
| 2013/0188715 A1* | 7/2013 | Seregin | H04N 19/61 375/240.16 |
| 2013/0315311 A1* | 11/2013 | Song | H04N 19/176 375/240.16 |
| 2013/0329007 A1* | 12/2013 | Zhang | H04N 19/52 348/43 |
| 2014/0016701 A1 | 1/2014 | Chen et al. | |
| 2014/0146887 A1* | 5/2014 | Watanabe | H04N 19/105 375/240.12 |
| 2014/0177711 A1* | 6/2014 | Kang | H04N 19/33 375/240.12 |
| 2014/0185682 A1* | 7/2014 | Chen | H04N 19/573 375/240.16 |
| 2015/0215640 A1* | 7/2015 | Lin | H04N 19/176 375/240.16 |
| 2020/0068218 A1* | 2/2020 | Chen | H04N 19/56 |

\* cited by examiner

US 10,911,769 B2

MOTION-BASED PRIORITY FOR THE CONSTRUCTION OF CANDIDATE LISTS IN VIDEO CODING

CLAIM OF PRIORITY UNDER 35 U.S.C. § 119

The present Application for patent claims priority to Provisional Application No. 62/524,420, filed Jun. 23, 2017 and assigned to the assignee hereof and hereby expressly incorporated by reference herein.

BACKGROUND

Field

This application is related to motion vector prediction in video codecs. More specifically, it relates to the construction of candidates lists from which reference blocks are selected for prediction.

Background

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010. In addition, there is a recently developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end_user/documents/12_Geneva/wg11/JCTVC-L1003-v34.zip. [HEVC] G. J. Sullivan; J.-R. Ohm; W.-J. Han; T. Wiegand (December 2012). "Overview of the High Efficiency Video Coding (HEVC) Standard" (PDF). IEEE Transactions on Circuits and Systems for Video Technology (IEEE) 22 (12). Retrieved 2012-09-14. A need exists for video codecs that support higher resolution and higher bit depths.

SUMMARY

Embodiments include techniques for generation of candidate motion vector lists for use in inter-prediction. For example, according to some embodiments, a candidate motion vector list is generated to have an order that is based on motion information of each of the candidate motion vectors.

One embodiment includes a method of constructing candidate lists for inter-prediction of a block of a current picture in a video encoder or decoder. The method includes generating a list of candidate motion vectors for inter-predicting a block of a picture, wherein the list is generated to have an order that is based on motion information of each of the candidate motion vectors, selecting a candidate motion vector from the list; and, performing inter-prediction of the block based on the selected candidate motion vector.

One embodiment includes a device for constructing candidate lists for inter-prediction of a block of a current picture. The device may include a video encoder or video decoder. The device includes a memory configured to store motion vectors associated with a plurality of blocks of a picture. The device further includes a processor configured to generate a list of candidate motion vectors for inter-predicting a block of the picture, wherein the list is generated to have an order that is based on motion information of each of the candidate motion vectors, select a candidate motion vector from the list, and perform inter-prediction of the block based on the selected candidate motion vector.

One embodiment includes a device for constructing candidate lists for inter-prediction of a block of a current picture. The device may include a video encoder or video decoder. The device includes means for storing motion vectors associated with a plurality of blocks of a picture. The device further includes means for processing video data that is configured to generate a list of candidate motion vectors for inter-predicting a block of the picture, wherein the list is generated to have an order that is based on motion information of each of the candidate motion vectors, select a candidate motion vector from the list, and perform inter-prediction of the block based on the selected candidate motion vector.

One embodiment includes a non-transitory computer-readable medium having stored thereon instructions that when executed by a processor, cause the process to generate a list of candidate motion vectors for inter-predicting a block of a picture, wherein the list is generated to have an order that is based on motion information of each of the candidate motion vectors, select a candidate motion vector from the list; and, perform inter-prediction of the block based on the selected candidate motion vector.

DETAILED DESCRIPTION

As discussed in further detail below, video codecs generally include the use of inter-prediction techniques to obtain substantial coding gain. In particular, inter-prediction techniques include motion compensated inter-prediction in which a block of a currently coded picture is predicted based on all or a portion of a block of a reference picture. The inter-prediction is motion compensated because the reference block may be located at a different location in the reference picture. The reference block pixels and the motion vector indicating the difference in location together are used to predict the current block.

In order to enable more efficient signaling of inter-prediction parameters, encoders and decoders, using a corresponding process, generate a list of candidate motion vectors from which one or more motion vectors is selected to code the current block. Existing inter-prediction techniques may generate these candidate lists in a predetermined order determined based on the location of neighboring blocks. A video encoder encodes data in a video bitstream that indicates to a video decoder which of the candidate motion vectors is to be used to encode/decode the block.

Embodiments include techniques for ordering candidate blocks based on motion information to determine the priority or insertion order Embodiments include using motion information to determine the priority or insertion order for the construction of candidate lists such as a merging candidate list and/or an advanced motion vector predictor (AMVP) candidate list. As discussed in further detail below, this motion information may include information associated with the reference block of a candidate motion vector such as a quantization parameter associated with the reference block or its picture. The motion information may also, or alternatively, include the temporal distance between the reference picture of a candidate block and the current picture. The motion information may also, or alternatively, include a coding type associated with the reference block or reference picture of a candidate motion vector. The motion information may also, or alternatively, include a similarity metric is calculated based on the collocated reference block of the current block to be predicted and the collocated reference block of the at least one neighboring block.

Advantages of such ordering include the ability to place more likely candidates earlier in the candidate list. In some embodiments, this can reduce the number of bits needed by an encoder to code data into the bitstream to the decoder to indicate which candidate is to be selected for coding the block.

Figure 1:
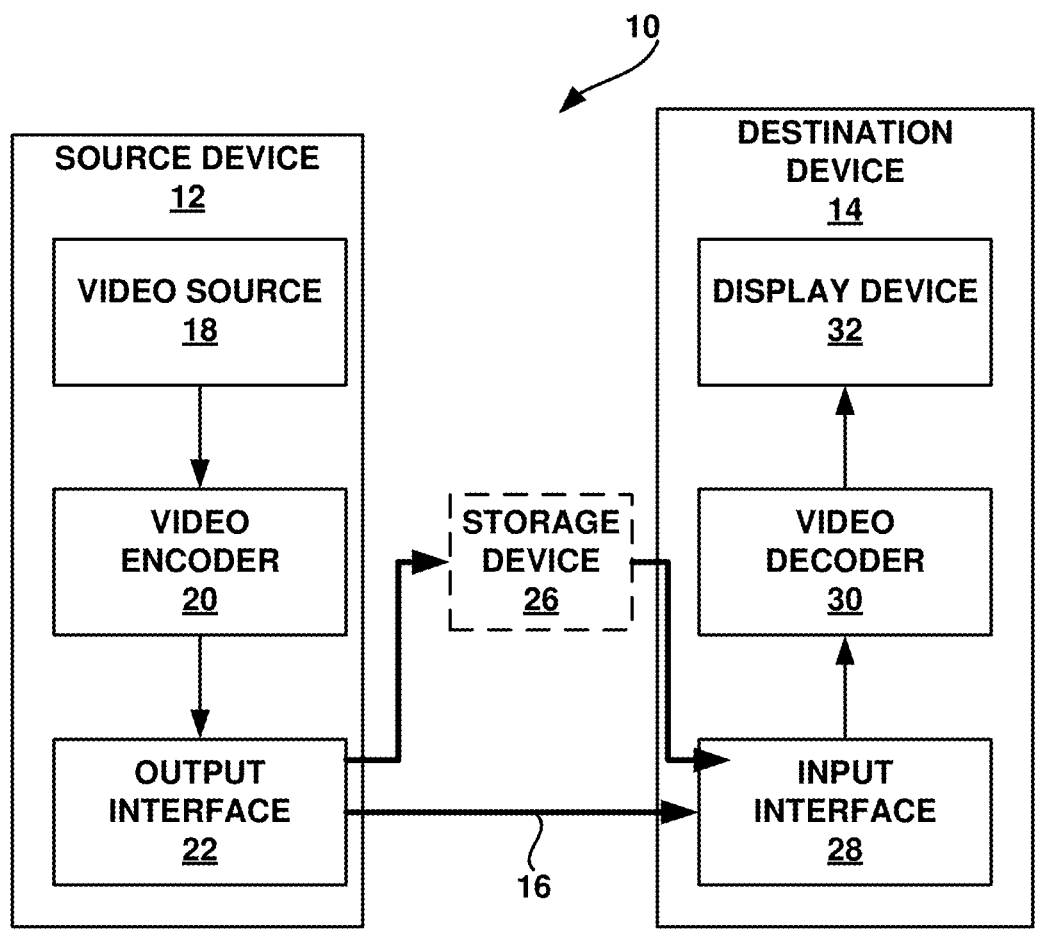
FIG. 1 is a block diagram illustrating an example video encoding and decoding system that may utilize the techniques described in this disclosure.

As context to discuss examples and embodiments in further details, FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called smartphones, camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to newer v video compression standards that operate similarly to the recently finalized High Efficiency Video Coding (HEVC) standard. In particular, techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Figure 2:
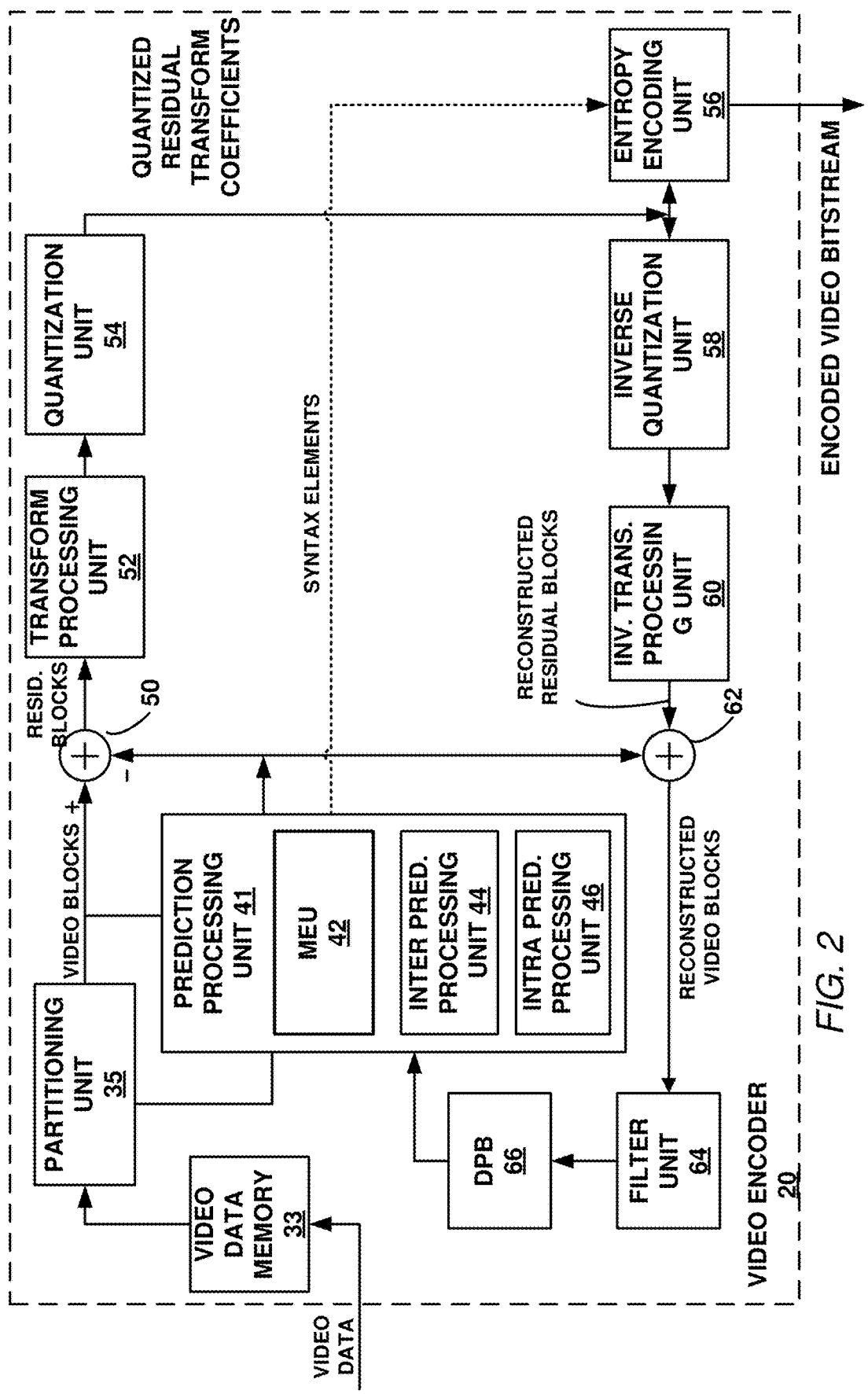
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 2, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. As discussed in more detail below, the motion vector for a block may be determined by a motion vector predictor from a candidate list of neighbor blocks. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more transform units (TUs), which contain transform blocks for each luma or chroma component, and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30 or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 2, video encoder 20 may include additional filters such as a deblock filter, a sample adaptive offset (SAO) filter, or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 3:
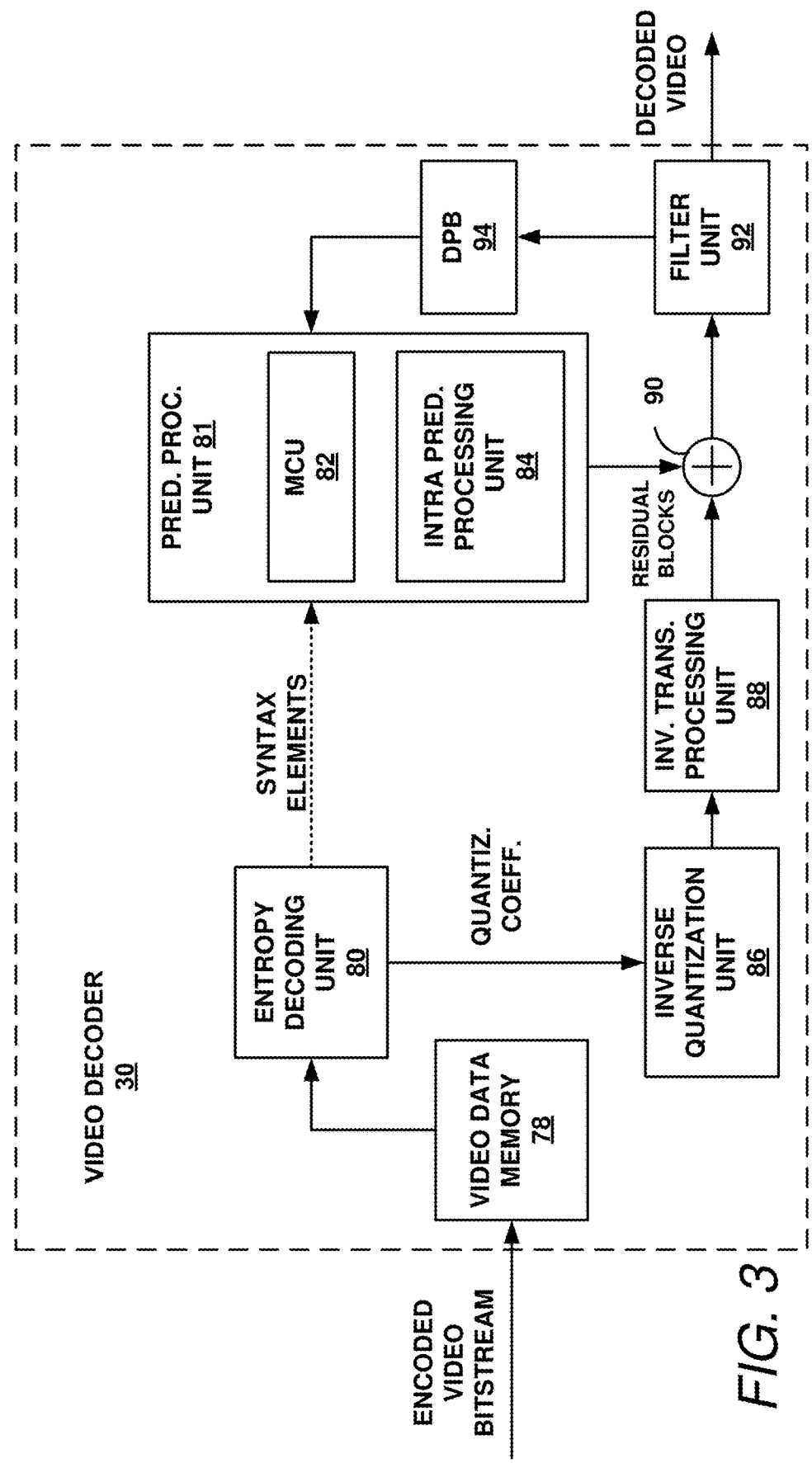
FIG. 3 is a block diagram illustrating an example video decoder that may implement the techniques described in this disclosure.

FIG. 3 is a block diagram illustrating an example video decoder 30 that may implement the techniques described in this disclosure. Video decoder 30 of FIG. 3 may, for example, be configured to receive the signaling described above with respect to video encoder 20 of FIG. 2. In the example of FIG. 3, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 20 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or another frequency transform process, to the transform coefficients in order to produce residual blocks in the pixel domain.

After prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. Filter unit 92 filters the reconstructed video block using, for example, one or more of the ALF techniques, SAO techniques, deblocking techniques or other such filtering techniques.

Although not explicitly shown in FIG. 2, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

In particular, with reference to operation of inter prediction processing units 44 and motion compensation unit 82, to code a block (e.g., of a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same picture, and other prediction units may be inter-coded (P or B) with respect to reference blocks in other pictures. In some cases, a reference block may be in the same picture. It is noted that the terms "picture" and "frame" are generally used interchangeably in the current application.

Upon identification of a predictor, the difference between the original video data block and its predictor is calculated. This difference is also called the prediction residual, and refers to the pixel value differences between the pixels of the block to be coded and corresponding pixels of the reference block, i.e., predictor. To achieve better compression, the prediction residual (i.e., the array of pixel difference values) is generally transformed, e.g., using a discrete cosine transform (DCT), integer transform, Karhunen-Loeve (K-L) transform, or other transform.

Coding a block using inter-prediction involves calculating a motion vector between a current block and a block in a reference picture. Motion information thus includes both a motion vector and an indication of the reference picture. Motion vectors are calculated through a process called motion estimation (or motion search). A motion vector, for example, may indicate the displacement of a prediction unit in a current picture relative to a reference sample of a reference picture. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference picture or reference slice. In some examples, the reference sample may occur at a fractional pixel position. Upon finding a portion of the reference picture that best matches the current portion, the encoder determines the current motion vector for the current portion as the difference in the location from the current portion to the matching portion in the reference picture (i.e., from the center of the current portion to the center of the matching portion).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

Rather than directly signaling the original motion vector, the encoder may predict a motion vector for each partition, i.e., for each PU. In performing this motion vector prediction, the encoder may select a set of candidate motion vectors determined from spatially neighboring blocks in the same picture as the current portion or a candidate motion vector determined from a co-located block in a reference picture. The encoder may perform motion vector prediction, and if needed, signal the prediction difference rather than signal an original motion vector to reduce bit rate in signaling. The candidate motion vectors from the spatially neighboring blocks may be referred to as spatial MVP candidates, whereas the candidate motion vector from the co-located block in another reference picture may be referred to as temporal MVP candidate.

Motion Information

For each block, various types of motion information may be available. The motion information includes motion information for forward and backward prediction directions. In some embodiments, forward and backward prediction directions are two prediction directions corresponding to different reference picture lists, e.g., reference picture list 0 (RefPicList0) and reference picture list 1 (RefPicList1) of a current picture or slice. The terms "forward" and "backward" do not necessarily have a geometry meaning. Instead, they are used to distinguish which reference picture list a motion vector is based on. Forward prediction means the prediction formed based on reference list 0, while backward prediction means the prediction formed based on reference list 1. In case both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted.

For each prediction direction, the motion information contains a reference index and a motion vector. A reference index is used to identify a reference picture in the corresponding reference picture list (e.g. RefPicList0 or RefPicList1). A motion vector has both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

Picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of POC may be closer to each other in terms of decoding order.

POC values of pictures are typically used for reference picture list construction, derivation of reference picture set as in HEVC and motion vector scaling.

Examples of Block Structure in Video Codecs

In H.264/AVC, each inter macroblock (MB) may be partitioned into four different ways:

One 16×16 MB partition
Two 16×8 MB partitions
Two 8×16 MB partitions
Four 8×8 MB partitions Different MB partitions in one MB may have different reference index values for each direction (RefPicList0 or RefPicList1).

When an MB is not partitioned into four 8×8 MB partitions, it has only one motion vector for each MB partition in each direction.

When an MB is partitioned into four 8×8 MB partitions, each 8×8 MB partition can be further partitioned into sub-blocks, each of which can have a different motion vector in each direction. There are four different ways to get sub-blocks from an 8×8 MB partition: one 8×8 sub-block, two 8×4 sub-blocks, two 4×8 sub-blocks, or four 4×4 sub-blocks. Each sub-block can have a different motion vector in each direction. Therefore, a motion vector is present in a level equal to or higher than sub-block. Further details of AVC can be found in [AVC] Wiegand, Thomas; Sullivan, Gary J.; Bjøntegaard, Gisle; Luthra, Ajay (July 2003). "Overview of the H.264/AVC Video Coding Standard" (PDF). IEEE Transactions on Circuits and Systems for Video Technology 13 (7). Retrieved Jan. 31, 2011.

In AVC, temporal direct mode could be enabled in either MB or MB partition level for skip or direct mode in B slices. For each MB partition, the motion vectors of the block co-located with the current MB partition in the RefPicList1 [0] of the current block are used to derive the motion vectors.

Each motion vector in the co-located block is scaled based on POC distances. In AVC, a direct mode can also predict motion information from the spatial neighbors.

HEVC Block Structure

In HEVC, the largest coding unit in a slice is called a coding tree block (CTB) or coding tree unit (CTU). A CTB contains a quad-tree the nodes of which are coding units.

The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information.

In the HEVC specification, there are two inter prediction modes, named merge (skip is considered as a special case of merge) and advanced motion vector prediction (AMVP) modes respectively for a prediction unit (PU). In merge mode, the encoder instructs a decoder, through bitstream signaling of prediction syntax, to copy a motion vector, reference index (identifying a reference picture, in a given reference picture list, to which the motion vector points) and the motion prediction direction (which identifies the reference picture list (List 0 or List 1), i.e., in terms of whether the reference picture temporally precedes or follows the currently picture) from a selected candidate motion vector for a current portion of the picture. To reconstruct a block in merge mode, the decoder obtains the predictive block using the derived motion information for the current portion, and adds the residual data to the predictive block to reconstruct the coded block.

In AMVP, the encoder instructs the decoder, through bitstream signaling, to only copy the motion vector from the candidate portion and use the copied vector as a predictor for motion vector of the current portion, and signals the motion vector difference (MVD). The reference picture and the prediction direction associated with the motion vector of the current portion are signaled separately. An MVD is the difference between the current motion vector for the current portion and a motion vector predictor derived from a candidate portion. In this case, the encoder, using motion estimation, determines an actual motion vector for the block to be coded, and then determines the difference between the actual motion vector and the motion vector predictor as the MVD value. In this way, the decoder does not use an exact copy of the candidate motion vector as the current motion vector, as in the merge mode, but may rather use a candidate motion vector that may be "close" in value to the current motion vector determined from motion estimation and add the MVD to reproduce the current motion vector. To reconstruct a block in AMVP mode, the decoder adds the corresponding residual data to reconstruct the coded block.

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index.

The candidates for both modes are derived similarly from the same spatial and temporal neighboring blocks.

Spatial Neighboring Candidates

Figure 4B:
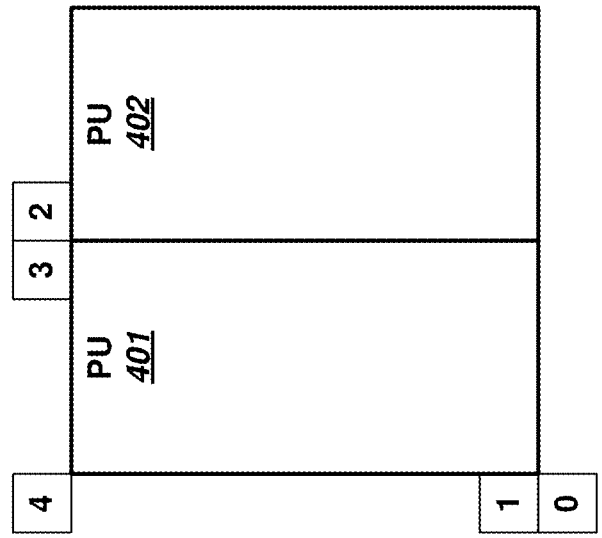
FIGS. 4a and 4b illustrate examples of two prediction units along with neighboring blocks at positions labeled according to a derivation order for a motion vector candidate list.
Figure 4A:
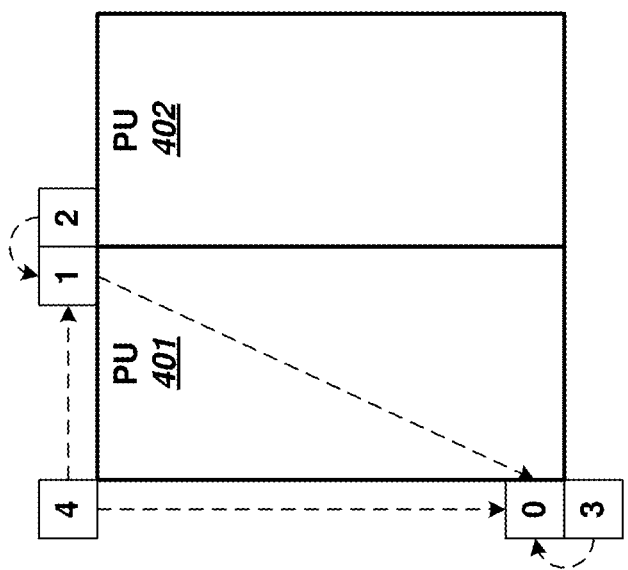

FIGS. 4a and 4b illustrate examples of two PUs 401 and 402 along with neighboring blocks at positions labeled according to a derivation order for a motion vector candidate list. Example spatial MV candidates are derived from the neighboring blocks shown on FIG. 4a, for a specific PU (e.g., PU 401 shown with neighboring PU 402), although the techniques generating the candidates from the blocks differ for merge and AMVP modes. In merge mode, in this example, up to four spatial MV candidates can be derived with the orders showed on FIG. 4a with numbers, and the order is the following: left (0, A1), above (1, B1), above right (2, B0), below left (3, A0), and above left (4, B2), as shown in FIG. 4a.

In AMVP mode, the neighboring blocks are divided into two groups: left group comprising the block at positions labeled 0 and 1, and above group comprising the blocks the blocks at positions labeled 2, 3, and 4 as shown on FIG. 4b. For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

Temporal Motion Vector Prediction in HEVC

Temporal motion vector predictor (TMVP) candidate, if enabled and available, is added into the MV candidate list after spatial motion vector candidates. The process of motion vector derivation for TMVP candidate may be the same for both merge and AMVP modes, however the target reference index for the TMVP candidate in the merge mode is always, in HEVC, set to 0.

Figure 5:
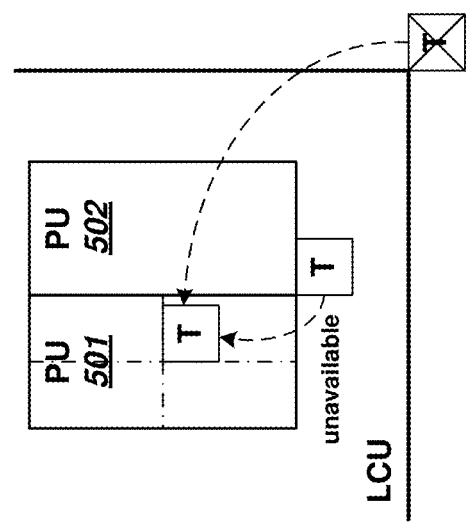
FIG. 5 is a diagram illustrating two example prediction units with respect to temporal motion vector predictor (TMVP) candidate generation.

FIG. 5 is a diagram illustrating two example PUs 501 and 502 with respect to TMVP candidate generation. The primary block location for TMVP candidate derivation is the bottom right block outside of the collocated PU 501 as shown in FIG. 5 as a block "T", to compensate the bias to the above and left blocks used to generate spatial neighboring candidates. However, if that block is located outside of the current CTB row or motion information is not available, the block is substituted with a center block of the PU.

Figure 6:
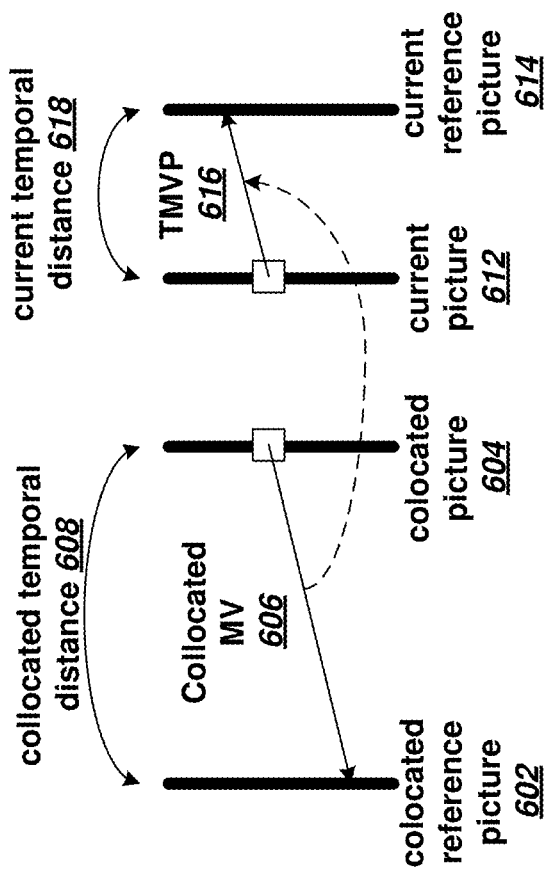
FIG. 6 is a diagram illustrating the relationship between a motion vector 606 and a TMVP candidate 616.

FIG. 6 is a diagram illustrating the relationship between a motion vector 606 and a TMVP candidate 616. A motion vector for TMVP candidate 616 is derived from the co-located PU of the co-located picture 604, indicated in the slice level. The motion vector for the co-located PU is identified as a collocated MV 606. Similar to temporal direct mode in AVC, to derive the TMVP candidate motion vector, the co-located MV is scaled to compensate the temporal distance differences.

Other Aspects of Motion Prediction in HEVC

Several aspects of merge and AMVP modes are provided as context as follows:

Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates are generated and inserted at the end of the list until it will have all candidates.

In merge mode, there are two types of artificial MV candidates: combined Bi-prediction candidate derived only for B-slices and default fixed candidates. Only zero candidate is used for AMVP if the first type doesn't provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones.

Figure 7:
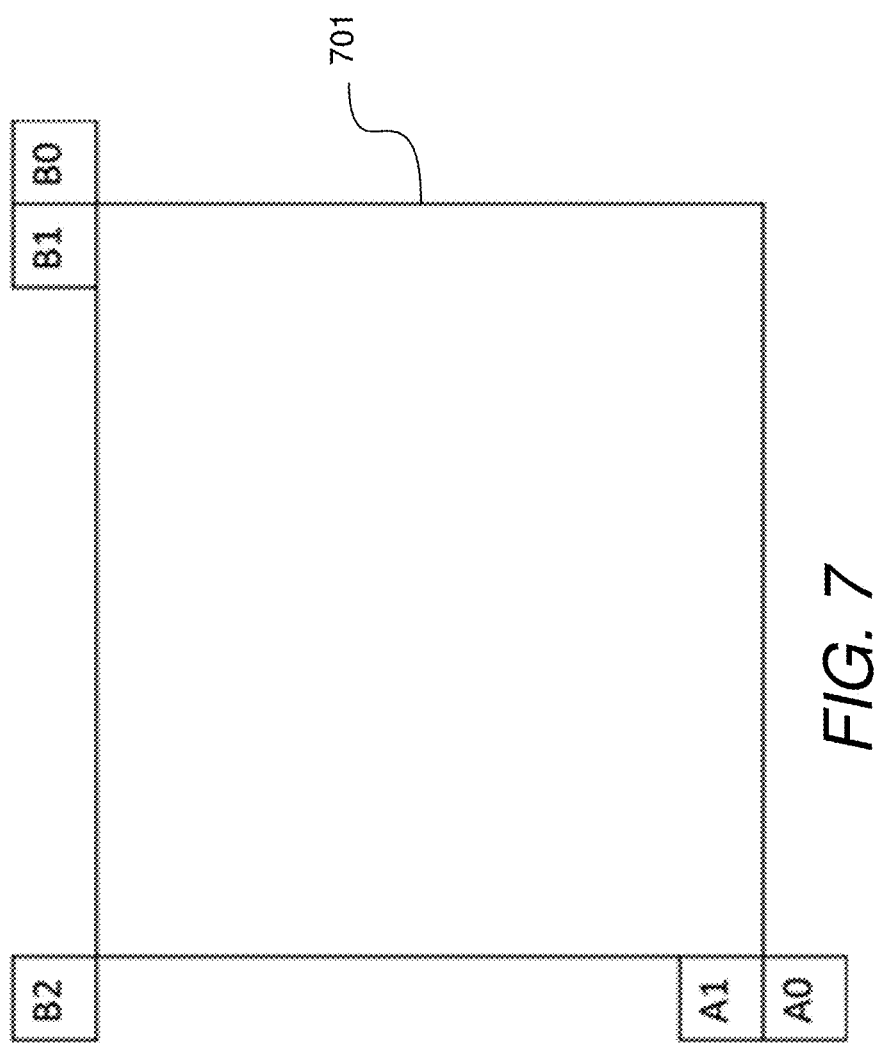
FIG. 7 illustrates a block and neighboring blocks.

FIG. 7 illustrates a block 701 and labeled neighboring blocks A0, A1, B0, B1, and B2. As described above, there are many priority-based candidate lists. Each candidate is inserted into the candidate list per a predefined priority. For example, in HEVC, a Merge candidate list or an AMVP candidate list are constructed by inserting candidates based on a predefined order (or per a predefined priority).

Figure 8:
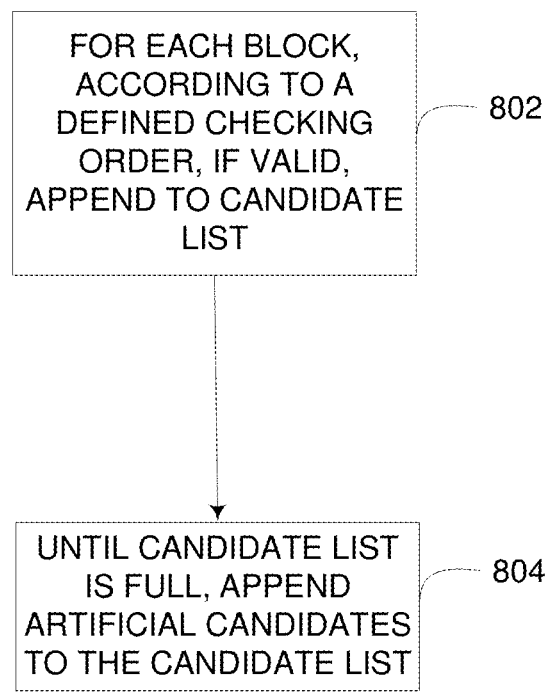
FIG. 8 is a flow chart illustrating an example technique for generating a merge candidate list.

FIG. 8 is a flow chart illustrating an example technique for generating a merge candidate list. As shown in FIG. 8, the intra prediction processing unit 44 of the encoder 20 or the MCU of the decoder 30 at a block 802 generates the merge candidate list by inserting the spatial merging candidate in a predefined order (A1→B1→B0→A0→B2→TMVP) at the end of the list. FIG. 8 illustrates the construction process of the merge candidate list according to a technique as in HEVC. Each spatial or temporal neighboring blocks are checked one by one to identify whether the block can provide a valid merge candidate. The term "valid" means the block exists, is inter-coded, the candidate list is not full, and the motion information in the block is not pruned by existing candidates in the current candidate list. For example, candidates with duplicate motion vectors may be pruned, depending on the embodiment. At a block 804, if the merge candidate list is not full after checking all spatial and temporal neighboring blocks, artificial candidates will be created to fulfill the merge candidate list. Artificial candidates may be generated as noted above.

Desirably, coding efficiency may be improved if a more likely candidate is earlier, e.g., has a higher priority, in the candidate list (and thus can be selected via a smaller index). In particular, according to some embodiments, the candidate list or ordered, or in some embodiments, reordered, according to motion information associated with the candidate motion vectors.

Figure 9:
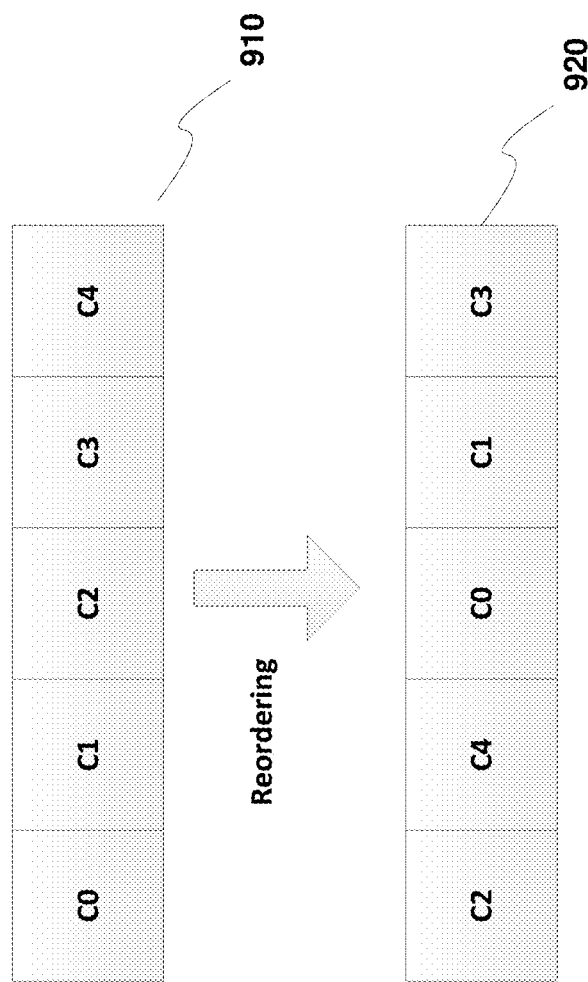
FIG. 9 is diagram illustrating an example merge list before and after reordering.

In one embodiment, the candidate list is constructed according to a checking order then candidates are added in a different, defined, order according to motion information of each candidate in the candidate list. In another embodiment, the entire candidate list is first constructed, then all the candidates in the list are reordered per the motion information of each candidate. The reordering can be performed using any suitable sorting method such as those known in the art. FIG. 9 illustrates an example of a merge list 910 before reordering and an illustration of that list 920, after reordering. In this example, the total candidate number in the merge candidate list is five as defined in HEVC but the same technique can be used with other sizes of candidate lists. After reordering, each candidate will have a new position in a resorted list 920, i.e., C2 will be the first one in the candidate list, which will be presented with the shortest code-word.

Figure 10:
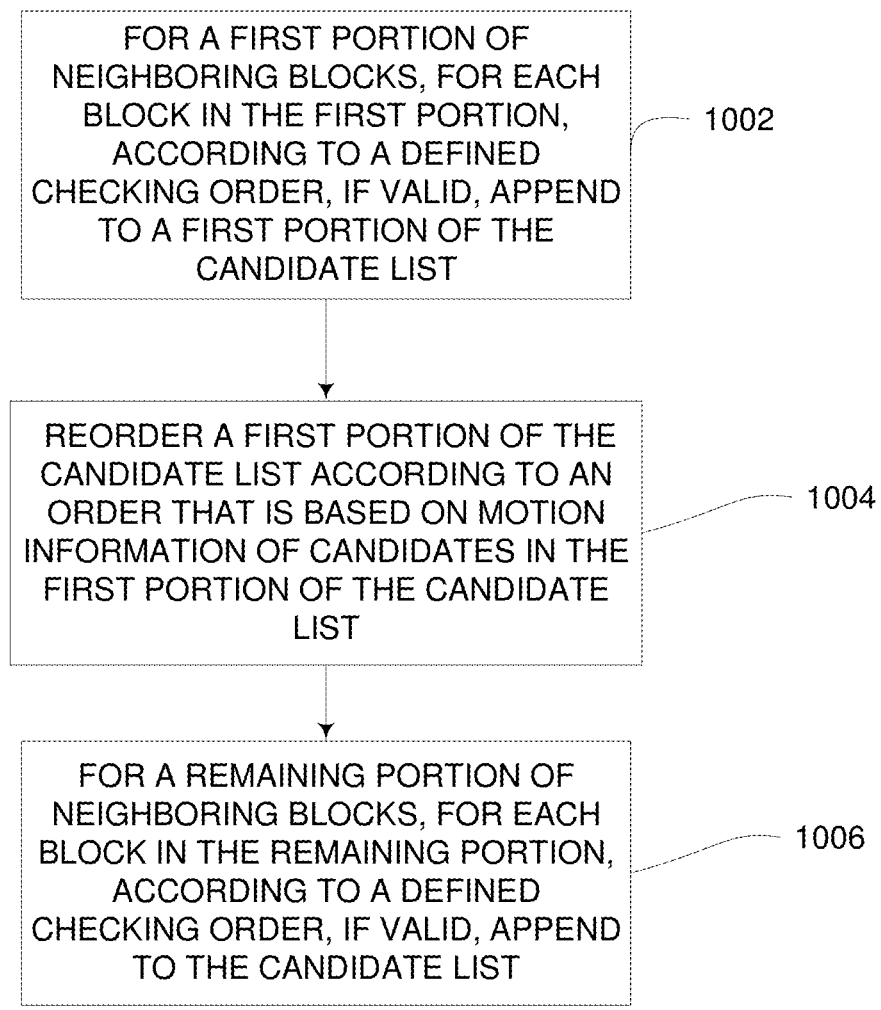
FIG. 10 is a flow chart illustrating another embodiment of a method of generating a candidate list.

FIG. 10 is a flow chart illustrating another embodiment of a method of generating a candidate list. In particular, after a part or several parts of the candidate list are constructed, then the part/parts of candidate list are reordered per the motion information of each candidate in the part/parts. In particular, at a block 1002, the intra prediction processing unit 44 of the encoder 20 or the MCU of the decoder 30, for a first portion of neighboring blocks, for each block in the first portion, according to a defined checking order, determines if a neighboring candidate is valid, and if so, appends the candidate to a first portion of the candidate list. Next at a block 1004 the intra prediction processing unit 44 of the encoder 20 or the MCU of the decoder 30, reorders the first portion of the candidate list according to an order that is based on motion information of candidates in the first portion of the candidate list. For example, the merge candidate list may, in one example, be reordered after the first four spatial neighboring blocks (A1, B1, B0, A0) have been checked. Next at a block 1006, For a remaining portion of neighboring blocks, for each block in the remaining portion, according to a defined checking order, if valid, the intra prediction processing unit 44 of the encoder 20 or the MCU of the decoder 30 appends the block to the candidate list. The remaining portion may include any additional artificial candidates that are added to the list. To continue the prior example, there are three candidates (C0, C1, C2) in the candidate list after the first four spatial neighboring blocks have been checked. After reordering, each candidate will have a new position in the list, i.e., C2 will be the first one in the candidate list, which will be presented with the shortest code-word. After the reordering, the other spatial/temporal neighboring blocks are checked in the predefined order, which will generate C3 and C4 put after the reordered first three candidates.

Figure 11:
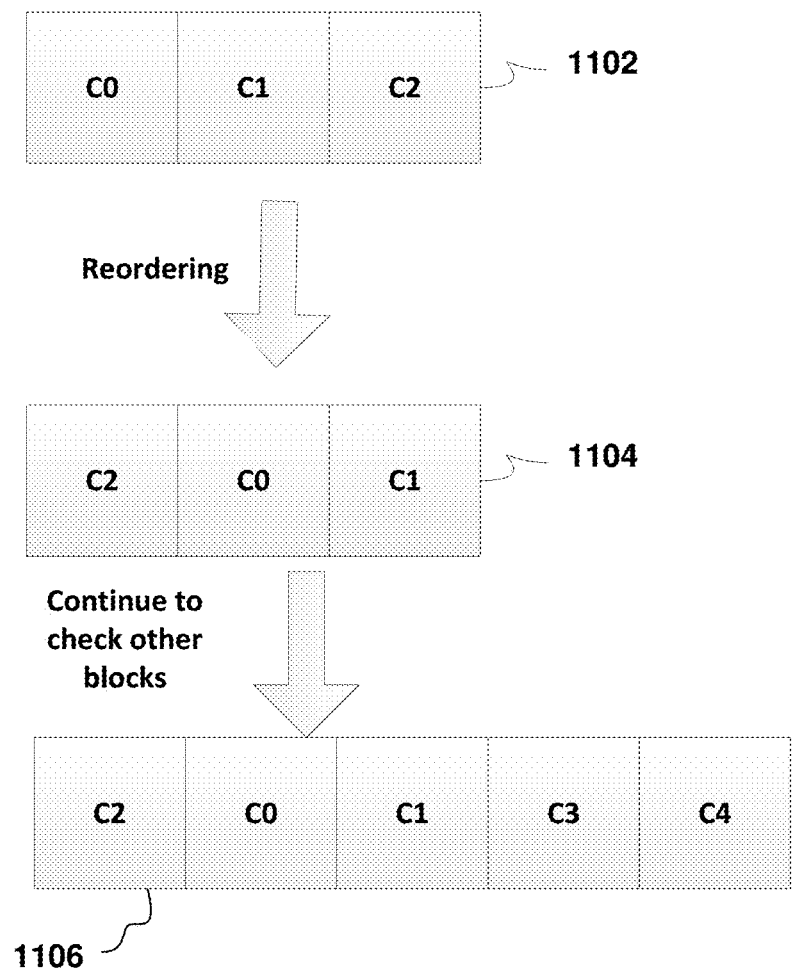
FIG. 11 illustrates an example candidate list according to the process of FIG. 10.

FIG. 11 illustrates an example candidate list according to the process of FIG. 10. In particular, the candidate list 1102 illustrates the candidate list after the block 1002 of FIG. 10. The candidate list 1104 illustrates the example candidate list after reordering according to the block 1004 of FIG. 10. The candidate list 1106 illustrates the example candidate list after the block 1006 inserts candidates from the remaining portion of the candidate list.

One or more types of motion information may be used to order the candidate lists. Optionally, in one embodiment, the inter-prediction direction is used as criterion to reorder the candidate lists. As used herein, the term "inter-prediction direction" refers to motion compensation prediction direction. For example, it can be "uni-prediction" from a single reference picture in Reference Picture List 0 or Reference Picture List 1. Or it can be "bi-prediction" from a weighted sum of two reference pictures. Optionally, as in one example, a partial ordering is defined in which the candidates with bi-prediction will be put ahead of the candidates with uni-prediction.

In some examples, the reordering of the candidate list is stable. That is, if two candidates have the same information as far as the partial ordering associated with the candidate list, the reordering does not change the order of those candidates. For example, if candidate X and candidate Y have the same inter-prediction direction and candidate X is before candidate Y before reordering, then candidate X should be before candidate Y after reordering.

Figure 12:
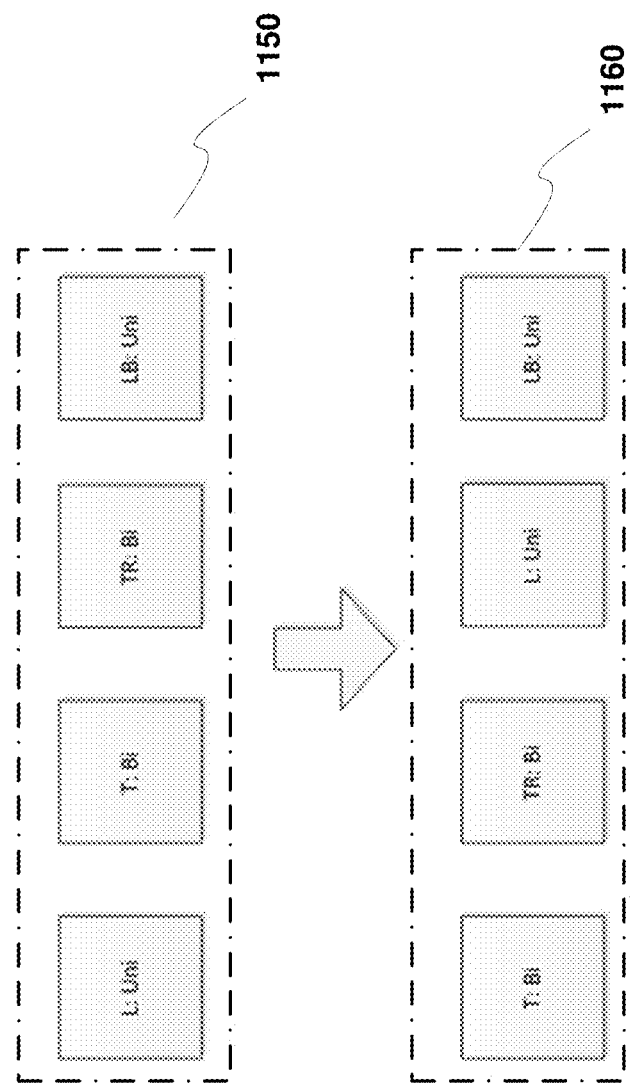
FIG. 12 illustrates an example of reordering the first four candidates per the inter-prediction direction of each candidate.

FIG. 12 illustrates an example of reordering the first four candidates per the inter-prediction directions. This partial example illustrates reordering after completion of the candidate list and reordering after the first 4 spatial blocks have been checked. In particular, after checking the first four spatial neighboring blocks (Left, Top, Top right, and Left Bottom or shortly L, T, TR and LB) in a list 1150, four candidates are put into the candidate list 1150 in the order L, T TR and LB. After reordering, the candidate list 1150 is represented in FIG. 12 as a list 1160. Since T and TR are bi-predicted and L and LB are uni-predicted, T and TR will be put ahead of L and LB as illustrated in the candidate list 1160. Since T is before TR in the list before reordering, T is still before TR after reordering. Since L is before LB in the list before reordering, L is still before LB after reordering. Thus, the final order is T, TR, L and LB as illustrated in the candidate list 1160.

In some embodiments, the motion information used for ordering/reordering the blocks comprise information associated with reference pictures/reference block. For example, Quantization Parameter (QP) of the reference picture/reference block may be used to reorder the candidate list. In some such examples, for Bi-prediction, a value calculated from the two associated QPs may be used. As such examples for Bi-prediction, the average value or the minimum value or the maximum value of the QPs of the two reference pictures/reference blocks can be treated as the QP to be considered. In one embodiment, the partial ordering is defined so that the candidates with a reference picture/reference block of a lower QP value will be put ahead of the candidates with a reference picture/reference block of a higher QP.

As another example, the temporal distance between the current picture and the reference picture can be used to reorder the candidate list. In some such examples, for Bi-prediction, a value calculated from the two associated temporal distances may be used. As such examples for Bi-prediction, the average value or the minimum value or the maximum value of the temporal distances between the current picture and the two reference pictures can be treated as the temporal distance to be considered. The temporal distance between the current picture and a reference picture can be calculated as |POCcur-POCref| where POCcur is the POC of the current picture and POCref is the POC of the reference picture.

In one embodiment, the candidates with a reference picture with a lower temporal distance to the current picture will be put ahead of the candidates with a reference picture with a higher temporal distance to the current picture.

For still another example, the coding type of the reference picture/reference block can be used to reorder the candidate list. The term "coding type" refers to the coding type of a picture, such as I-frame, P-frame and B-frame (in for example HEVC); or the coding type of a block, such as intra-coded block and inter-coded block. In one embodiment, the candidates with a reference picture as an I-frame will be put ahead of the candidates with a reference picture of a P-frame or B-frame. In one embodiment, the candidates with a reference block as intra-coded will be put ahead of the candidates with a reference block of inter-coded. For still another example, a motion similarity metric is calculated for each spatial neighbor candidate. The candidate with a higher similarity will be put ahead of a candidate with a lower similarity in the merge candidate list.

Figure 13:
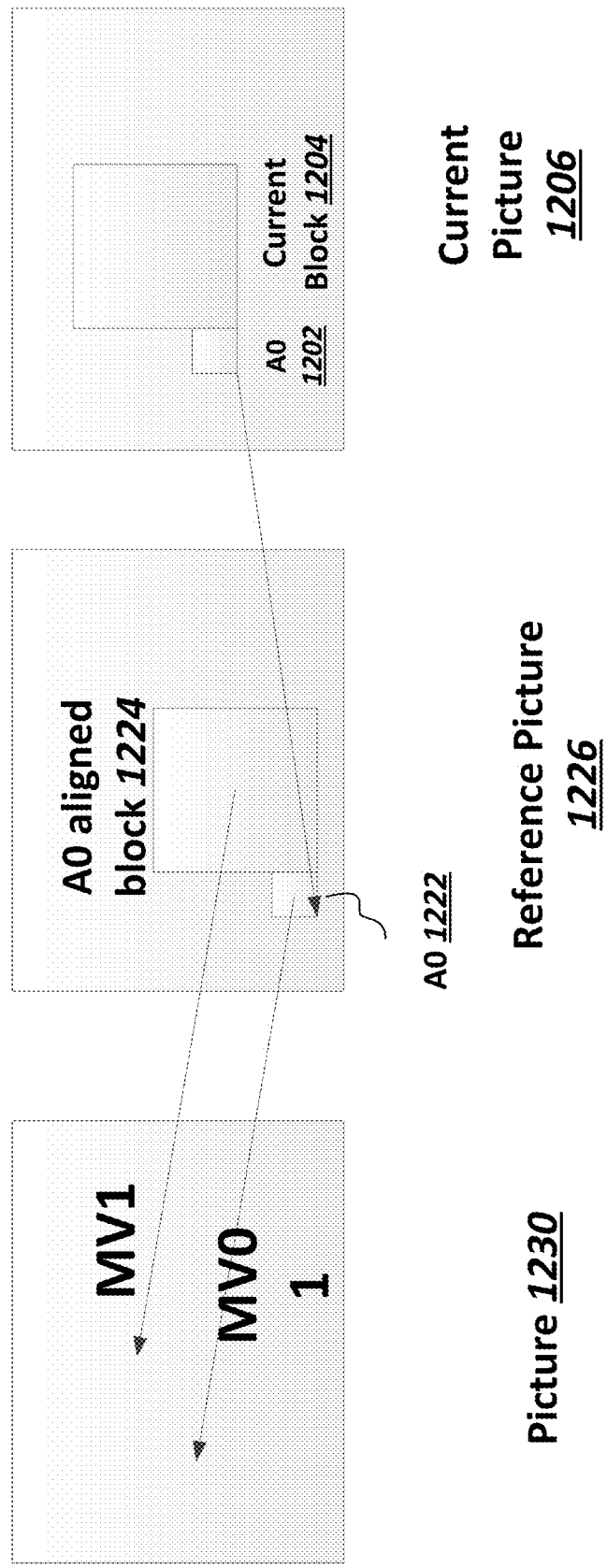
FIG. 13 illustrates an example of how to calculate MV similarity for a neighboring block of another block in a current picture.

As an embodiment, the ordering of the candidate list may be based on a calculation of motion vector similarity of the collocated reference block of the current block and the collocated reference block of the neighboring blocks. FIG. 13 illustrates an example of how to calculate MV similarity for a neighboring block A0 1202 of a block 1204 in the current picture 1206. With the motion vector of A0, the collocated reference block 1222 of block A0 1202 in the reference picture 1226 is located in the reference picture 1226. Similarly, also with the motion vector of A0, the collocated reference block 1224 of the current block 1204 is located in the reference picture 1226. Then the motion of collocated reference block of block A0 (marked as MV0) and the motion of collocated reference block of the current block (marked as MV1) can be found in picture 1230. The MV similarity of the neighboring block A0 (labeled as S) can be calculated with MV0 and MV1. In one embodiment, motion similarity (S) is set to be 0 if MV0 and MV1 are different and S is set to be 1 if MV0 and MV1 are the same. In another embodiment, the absolute difference of MV0 and MV1 are calculated as $D=|MV0x-MV1x|+|MV0y-MV1y|$. Then S can be calculated as a descending function of D, such as $S=1-D$ or $S=1/D$. In another embodiment, S is set as the smallest value (e.g. 0) if the collocated reference block of A0 block 1222 or the collocated reference block 1224 of the current block 1204 is intra-coded.

In another embodiment, if a neighboring block A0 1202 is bi-predicted, then the motion similarity can be calculated for the motion vector of reference list 0 and reference list 1 respectively, noted as S0 and S1. S can be calculated as the average value of S0 and S1, the minimum value of S0 and S1 or the maximum value of S0 and S1.

It is to be appreciated that in some embodiments the partial ordering that defines the ordering or reordering of the candidate list may be based on a combination of two or more of the partial ordering discussed above. In some embodiments, a first portion of the candidates, defined by checking order or motion information of the candidate block, may be ordered according to one partial ordering and the remaining portion by another partial ordering.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Various embodiments of the invention have been described.

The invention claimed is:

1. A method of constructing candidate lists for inter-prediction of a block of a current picture, comprising:
generating a list of candidate motion vectors for inter-predicting a block of a current picture, comprising:
calculating a motion vector similarity metric for each of the candidate motion vectors, wherein calculating the motion vector similarity metric for each of the candidate motion vectors comprises calculating the motion similarity metric for at least one of the candidate motion vectors that corresponds to a spatial neighboring block based on a difference between a motion vector of a corresponding collocated reference block of the current block and a motion vector of a collocated reference block of the spatial neighboring block,
wherein calculating the motion vector similarity metric for the at least one of the candidate motion vectors that corresponds to the spatial neighboring block comprises calculating a sum of the absolute value of a difference between the x component and a difference between the y component of the motion vector of the collocated reference block of the current block and the motion vector of the collocated reference block of the spatial neighboring block; and
positioning the candidate motion vectors in an order within the list that is based on the motion vector similarity metric calculated for each of the candidate motion vectors;
the method further comprising:
selecting a candidate motion vector from the list; and
performing inter-prediction of the block based on the selected candidate motion vector.

2. The method of claim 1, wherein each of the candidate motion vectors comprises a motion vector, a reference index, and the motion prediction direction.

3. The method of claim 1, wherein performing inter-prediction comprises performing inter-prediction according to a merge mode.

4. The method of claim 1, wherein each of the candidate motion vectors comprises a motion vector, a reference index, and the motion prediction direction and wherein performing inter-prediction comprises performing inter-prediction according to an advanced motion vector prediction mode.

5. The method of claim 1, further comprising encoding, to a video bitstream, the block based on the inter-prediction of the block, wherein encoding the block comprises:
generating a residual based on the block of the picture and a prediction block generated as part of performing the inter-prediction; and
encoding data to the video bitstream for performing the inter-prediction, and the residual.

6. The method of claim 1, further comprising decoding, from an encoded video bitstream, the block based on the inter-prediction of the block, wherein decoding the block comprises:
decoding a residual from the encoded video bitstream; and
decoding the block of the picture based on a prediction block generated as part of performing the inter-prediction and the residual, and wherein selecting the candidate motion vector from the list is based on information from the encoded video bitstream.

7. The method of claim 1, wherein generating the list of candidate motion comprises:
constructing the entire candidate list according to a first order; and reordering the candidate list according to the order that is based on the motion vector similarity metric of each candidate motion vectors.

8. The method of claim 1, wherein generating the list of candidate motion comprises:
constructing a first portion of the candidate list according to a first order comprising including at least one candidate motion vector in the candidate list;
reordering the first portion of the candidate list according to the order that is based on the motion vector similarity metric of each of the candidate motion vectors in the first portion of the candidate list;
constructing a remaining portion of the candidate list comprising adding at least one additional candidate motion vector in the candidate list.

9. The method of claim 1, wherein the reordering is performed such that candidates that have identical values in a partial ordering associated with the order of the candidate list are not reordered.

10. A device for constructing candidate lists for inter-prediction of a block of a current picture, comprising:
a memory configured to store motion vectors associated with a plurality of blocks of a picture; and
a processor configured to:
generate a list of candidate motion vectors for inter-predicting a block of the current picture, wherein to generate the list, the processor is configured to:
calculate a motion vector similarity metric for each of the candidate motion vectors, wherein to calculate the motion vector similarity metric for each of the candidate motion vectors, the processor is configured to calculate the motion similarity metric for at least one of the candidate motion vectors that corresponds to a spatial neighboring block based on a difference between a motion vector of a corresponding collocated reference block of the current block and a motion vector of a collocated reference block of the spatial neighboring block and wherein to calculate the motion vector similarity metric for the at least one of the candidate motion vectors that corresponds to the spatial neighboring block, the processor is further configured to calculate a sum of the absolute value of the differences between the x and y components of the motion vector of the collocated reference block of the current block and the motion vector of the collocated reference block of the spatial neighboring block; and
position the candidate motion vectors in an order within the list that is based on the motion vector similarity metric calculated for each of the candidate motion vectors;
the processor being further configured to:
select a candidate motion vector from the list; and
perform inter-prediction of the block based on the selected candidate motion vector.

11. The device of claim 10, wherein each of the candidate motion vectors comprises a motion vector, a reference index, and a motion prediction direction.

12. The device of claim 10, wherein the processor is configured to perform inter-prediction according to a merge mode.

13. The device of claim 10, wherein each of the candidate motion vectors comprises a motion vector, a reference index, and a motion prediction direction and wherein the processor is configured to perform inter-predication according to an advanced motion vector prediction mode.

14. The device of claim 10, wherein the processor is configured to encode, to a video bitstream, the block based on the inter-prediction of the block, wherein the processor is further configured to:
generate a residual based on the block of the picture and a prediction block generated as part of performing the inter-prediction; and
encode data to the video bitstream indicative of how to perform the inter-prediction and indicative of the residual.

15. The device of claim 10, wherein the processor is configured to decode, from an encoded video bitstream, the block based on the inter-prediction of the block, wherein the processor is further configured to:
decode a residual from the encoded video bitstream; and
decode the block of the picture based on a prediction block generated as part of performing the inter-prediction and the residual, and wherein the processor is configured to select the candidate motion vector from the list based on information from the encoded video bitstream.

16. The device of claim 10, wherein to generate the list of candidate motion in the order, the processor is configured to:
construct the entire candidate list according to a first order; and
reorder the candidate list according to the order that is based on the motion vector similarity metric of each candidate motion vectors.

17. The device of claim 10, wherein to generate the list of candidate motion in the order, the processor is configured to:
construct a first portion of the candidate list according to a first order comprising including at least one candidate motion vector in the candidate list;
reorder the first portion of the candidate list according to the order that is based on the motion vector similarity metric of each of the candidate motion vectors in the first portion of the candidate list; and
construct a remaining portion of the candidate list comprising adding at least one additional candidate motion vector in the candidate list.

18. The device of claim 17, wherein the reordering is performed such that candidates that have identical values in a partial ordering associated with the order of the candidate list are not reordered.

* * * * *